United States Patent
Rosenberg

[15] 3,679,313
[45] July 25, 1972

[54] DISPERSIVE ELEMENT FOR OPTICAL PULSE COMPRESSION

[72] Inventor: Robert Rosenberg, Fair Haven, N.J.

[73] Assignee: Bell Telephone Laboratories Incorporated, Murray Hill, N.J.

[22] Filed: Oct. 23, 1970

[21] Appl. No.: 83,414

[52] U.S. Cl. ............................................356/112, 331/94.5
[51] Int. Cl. ........................................G01b 9/02, H01s 3/00
[58] Field of Search .....................331/94.5; 356/106, 113; 350/160

[56] References Cited

UNITED STATES PATENTS 3,459,466  8/1969  Giordmaine ..........................350/160
3,551,034  12/1970  Tournois et al. ........................350/321

Primary Examiner—Ronald L. Wibert
Assistant Examiner—Conrad Clark
Attorney—R. J. Guenther and E. W. Adams, Jr.

[57] ABSTRACT

An interferometer cavity defined by two mirrors of different reflectance is advantageously adjusted to achieve superior compression of optical pulse signals. In particular, a mirror of predetermined partial reflectance is juxtaposed with a mirror of substantially total reflectance, the separation distance being detuned by a calculated amount from a condition of resonance with the optical pulse input. The detuning distance is calculated in terms of the physical characteristics of the cavity and certain delimiting characteristics of the optical pulse signals.

10 Claims, 5 Drawing Figures

3,679,313

DISPERSIVE ELEMENT FOR OPTICAL PULSE COMPRESSION

BACKGROUND OF THE INVENTION

This invention relates to optical pulse system. In particular, it relates to dispersive structures for the compression in time of certain classes of optical signal pulses.

The techniques of chirp radar have recently been adapted to the optical domain for the purpose of narrowing the envelopes of optical pulses. In one application of chirp radar techniques to optical pulse compression, individual pulses are first modulated in time with a linear frequency sweep (i.e., they are chirped) and are then conveyed to and through a dispersive element. It is the function of the dispersive element to subject the optical pulse to a frequency dependent time delay. This dispersion causes earlier portions of the frequency-swept pulse to be transmitted more slowly than later portions, thereby effecting a pulse compression in time.

The structures which have been used for pulse compression need not operate on signals having pulse envelopes, however. Generally speaking, the envelopes may have any variation in time which is slow compared to the carrier period. Under the envelope, suitably chirped segments of the signal can be converted to pulses by the dispersive structure.

One class of dispersive structure which has been used for optical pulse compression utilizes a parallel pair of matched deflecting diffraction gratings. A diffraction grating dispersive structure is shown in an article by E. B. Tracy in Phys. Letters 28A, 34 (1968), entitled, "Compression of Picosecond Light Pulses." In such a dispersive structure, each frequency component follows a unique path which is determined by the diffraction conditions, the consequent variation of path length being a function of frequency. The arrangement therefore provides a frequency dependent time delay. While this type of dispersive structure provides compression over a relatively wide frequency band, its timing delay range is relatively short in practical applications.

Another class of dispersive structure, which can be used to achieve a much larger time delay range, is a short interferometer consisting of a pair of mirrors of different reflectance. Such an interferometer is shown in an article by F. Gires and P. Tournois entitled, "Interferometer Useful for the Compression of Frequency Modulated Optical Pulses" (Comptes Rendus, 258, June 1964, page 6112). A high reflective mirror faces a mirror of intermediate reflectance which serves as the optical input and output face. A wave which impinges on this structure is partially reflected each time it strikes the intermediate reflectance face and is completely reflected each time it strikes the high reflectance face. The output wave is therefore a superposition of differently phased segments of the input wave; the net effect is a frequency dependent time delay of the input wave. Overall, the time delay is periodic in frequency, but in certain restricted frequency bands the delay is linear in frequency. The design of priorly shown dispersive interferometers has been aimed at fitting within a single one of these linear frequency bands the entire spectrum of a frequency-swept input pulse. It is characteristic of such a design that when the frequency spectrum of the input pulse spans a relatively wide band, the spacing between the interferometer mirrors must be short. A short spacing is also required so that a multiplicity of reflections will occur within a time interval shorter than the desired compressed pulse duration. Because of the short spacing, the attainable frequency dependent time delays are also short and generally insufficient to produce adequate pulse narrowing. Acceptable narrowing is accomplished by passing the wave repeatedly through the interferometer with the help of a third (high reflectance) mirror. Successive passages are kept spatially separated in order to maximize pulse narrowing.

This spatial separation constraint introduces two difficulties which become more serious as the number of passages increases. First, since separation of the waves is achieved by tilting the light beam relative to the axis of the interferometer, the multiplicity of reflections occurring at each passage is slightly offset spatially from one another. This offset problem, known as "walk off," is enhanced from one passage to the next, so that the output wave progressively departs from the intended superposition. The other problem also stems from the beam tilt. Increasing the number of passages increases the required aperture of the interferometer. However, even a small aperture dispersive interferometer presents severe constraints on mirror shape, smoothness, separation and mechanical stability. Large aperture structures, therefore, are quite costly and extremely difficult to fabricate and operate.

In summary, prior art dispersive structures suffer from severe constraints on time delay and frequency bandwidth capability, in addition to posing such problems as walk off and difficulty of fabrication and operation.

SUMMARY OF THE INVENTION

The present invention is a new design for an interferometer dispersive element which obtains superior compression characteristics by means of a uniquely designed reflecting interferometer cavity which conforms to certain classes of input signals. In particular, the input signals with which the present invention operates have a comb-type frequency spectrum, and the interferometer is designed such that the various frequency components of the pulses to be compressed are positioned in separate linear frequency bands of the interferometer time delay characteristic. A detailed summary of input signal requirements will be described hereinafter. The interferometer cavity is adjusted such that the time required for a signal to make a round trip through the cavity is slightly detuned from the values of certain periodic parameters of the input signals.

In an illustrative embodiment of the present invention, a pulse signal of the required class is delivered through a directional coupler and mode matching lenses to a dispersive structure. For example, signals of the required class may be produced by a mode locked laser source succeeded by a synchronous phase modulator. The dispersive structure is an interferometer cavity comprising two curved and mutually reflecting mirrors, one mirror having substantially complete reflectance and the other having substantially less reflectance. The separation of the mirrors is uniquely designed to conform to certain selected parameters of the signals. The multiple reflections within the cavity are superimposed in space, and the compressed output pulse represents a superposition of contributions from a number of input pulses. As the compressed pulses leave the interferometer cavity, they return through the mode matching lenses and the directional coupler to be transmitted to an output as compressed optical pulses.

It is a feature of the present invention that an interferometer cavity of relatively simple structure is advantageously designed for use as an optical dispersion element which shows substantial improvement over the prior art in optical pulse compression capability. Dispersive structures which embody the principles of the present invention achieve superior time delays and frequency bandwidth capabilities. Moreover, the unique design of the interferometer eliminates the need for auxiliary reflectors and large apertures, since it allows for sufficiently long time delays and thereby eliminates the need for repeated passages through the interferometer structure. The design of the present invention also features on-axis illumination of the cavity, thereby eliminating walk-off problems and manufacturing difficulties. The cumulative effect of these separate features is a substantial improvement in the compression of optical pulses.

These and other features of the present invention will be more apparent when the following detailed description is considered in conjunction with the drawings.

DETAILED DESCRIPTION

Figure 1:
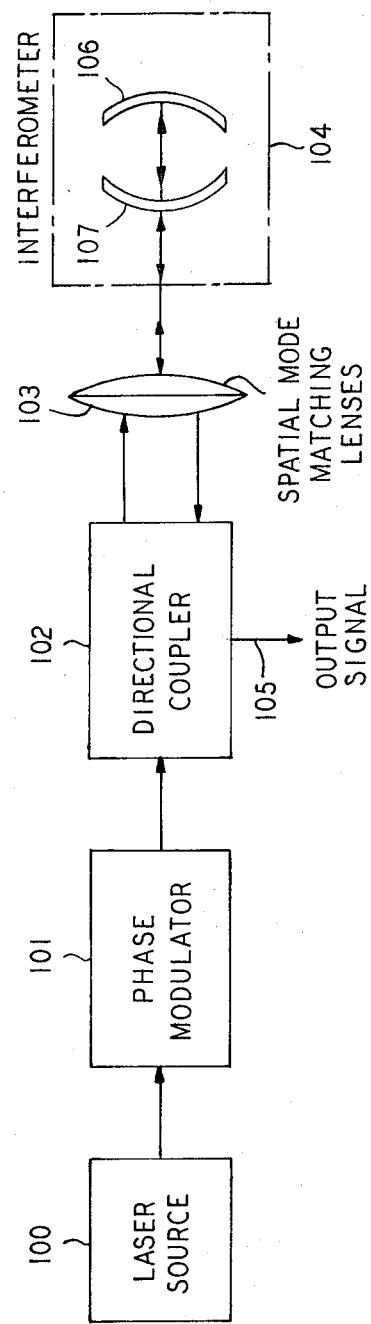
FIG. 1 shows an illustrative embodiment of the present invention.

An illustrative embodiment of the invention is shown in FIG. 1. More particularly, FIG. 1 shows a block diagram of an illustrative embodiment of the invention and FIG. 2 shows a spatially distorted version of a portion of the embodiment of FIG. 1, the interferometer dispersive structure 104.

In the embodiment of FIG. 1, signals are introduced from a single-frequency laser source 100 to an external phase modulator 101. Such a signal source provides input signals which contain frequency chirps in systems analogous to the aforementioned chirp radar systems. An extreme example of a chirp pulse would be one with a blue leading edge, a yellow peak, and a red trailing edge. The pulse is characterized by a frequency spectrum commonly known as a comb-type spectrum (i.e., a spectrum made up of a plurality of equally spaced monochromatic bands). The signals are transmitted from the phase modulator 101 to a directional coupler 102 which, in turn, transmits signals through a spatial mode matching lens (or set of lenses) 103 to an interferometer dispersive structure 104. The mode matching lenses 103 functions to adjust the diameter of the light beam and the curvature of the beam wavefronts such that the interferometer structure 104 may function efficiently. The interferometer dispersive structure comprises a pair of curved surface portions of spherical mirrors 106 and 107, the concavities of the mirrors 106 and 107 facing one another. After the signals have been time-compressed in the interferometer dispersive structure 104, they are transmitted back through the lens 103 to the directional coupler 102. Thereafter, the directional coupler 102 transmits the compressed pulses as output signals.

The directional coupler 102 may be variously embodied by any means which are capable of transmitting the light signals along one path in one direction and along another path in the reverse direction. For example, one embodiment of the directional coupler 102 which could operate successfully in the present invention is a biprism followed by a 45° Faraday rotator. Such an embodiment transmits linearly polarized signals from the signal source 101 to the lens 103 and orthogonally polarized signals from the lens 103 to the output 105 without intermixing the signals.

Figure 2:
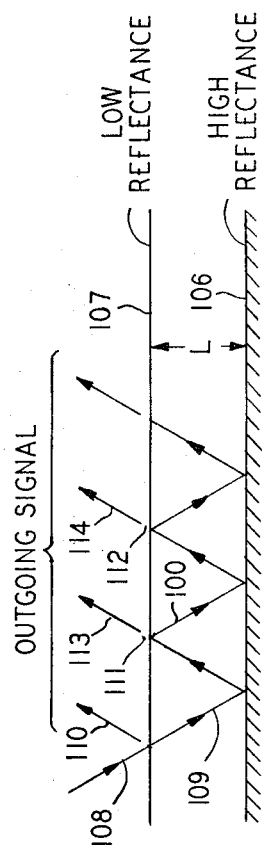
FIG. 2 shows a spatially distorted sectional view of the interferometer cavity in FIG. 1.

The actual compressing of the optical signals takes place in the dispersive structure 104, a spatially elongated view of which is shown in FIG. 2. The dispersive structure 104 comprises a cavity defined by two mirrors, one mirror 106 having a high reflectance (in the ideal case, 100 percent reflectance) and the other mirror 107 having a reflectance which is substantially lower than that of mirror 106. As the incoming signal is delivered to the first mirror 107 from the lens 103, it is partially reflected, and partially transmitted into the cavity defined by the two mirrors 106 and 107. Second mirror 106 is a substantially perfect reflector (small unavoidable losses have been proven to have a negligible effect on the operation of the invention), and the part of the incoming signal which is transmitted by mirror 107 is therefore completely reflected by the mirror 106. Thereafter, the signal is reflected back and forth between the two mirrors 106 and 107 as it passes through the cavity. Each time the signal impinges upon the low reflectance mirror 107, part of the signal is reflected back into the cavity and part passes through the mirror 107, due to its low reflectance. For example, in FIG. 2 at point 111, the incoming signal is separated into two components, a reflected component 100 and a transmitted output component 113. This division also takes place at points 108, 112, etc. The components of light which are transmitted through the low reflectance mirror 107 comprise the outgoing signal.

In FIG. 2 the mirrors 106 and 107 have been represented by planes and the various reflections have been tiled from the perpendicular only for the sake of clarity of explanation. In practice, the mirrors will be slightly curved portions of spherical surfaces with concavities facing each other as shown in FIG. 1. The light will be in the form of beams with a Gaussian amplitude distribution whose axes coincide with an axis of the mirror pair, and all reflections will fill the same region of space when the matching lens system 103 is correctly adjusted.

The separation of the two mirrors 106 and 107, designated as L, is critical. It is the adjustment of this separation which makes the present invention an effective means for the compression of optical pulses. This result will be evident from the following considerations. Dispersive elements achieve pulse compression by subjecting the pulse signal to be compressed to a frequency dependent time delay. In other words, the dispersive element 104 delays signal components of different frequency by different amounts and can therefore be used to rephase the signal components to reinforce each other periodically.

Figure 3:
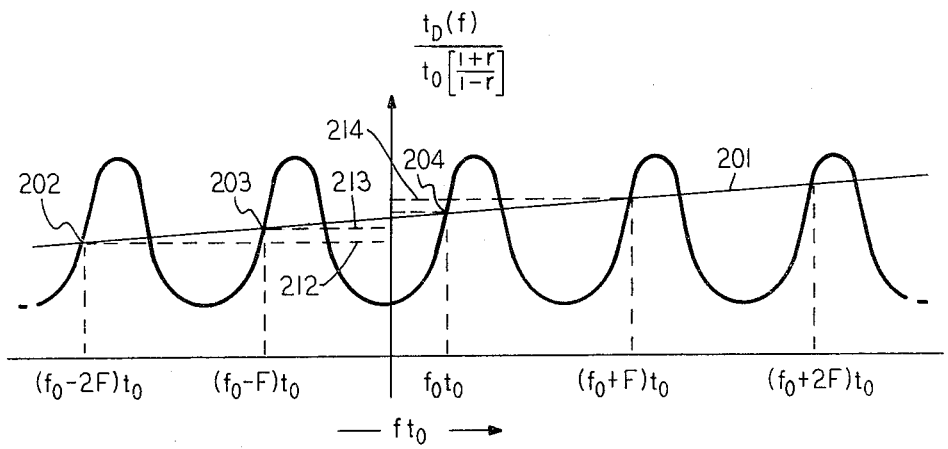
FIG. 3 shows the graph of a characteristic curve of the present invention.

To provide the desired compression, the dispersive element 104 must in turn provide a time delay function $t_D(f)$ which is linear in frequency ($f$), over some frequency range $\Delta f$ about some predetermined central optical frequency $f_o$ (preferably the optical carrier frequency). That is, $$t_D(f) = p(f - f_o) \text{ for } |f - f_o| < \Delta f/2 \tag{1}$$

where $p$ is a proportionally constant. For the interferometer class of dispersive elements the function $t_D(f)$ is a periodic function described as $$t_D(f) = t_0 \left[\frac{1+r}{1+r}\right] \frac{1}{\left[1 + \frac{4r}{(1-r)^2}\sin^2(\pi f t_0)\right]} \tag{2}$$

where $r$ is the amplitude reflectance of the first mirror 107 and $t_0$ is equal to $2L/C$, where $L$ is the cavity length (axial separation of the mirrors) and $C$ is the speed of light. For any given interferometer cavity with a predetermined spacing of the mirrors, $t_0$ is, of course, a constant. This periodic function is shown in a graph of $$\frac{t_D(f)}{t_0 \left[\frac{1+r}{1+r}\right]}$$

versus $tf_o$ in FIG. 3. The prior art interferometer dispersive elements have operated on a single portion of the periodic curve of FIG. 3 which satisfies the linear frequency requirement of Equation 1. It is obvious that only very small portions of the function of FIG. 3 are linear. This operation in turn limited the frequency bandwidth (measured along the abscissa of FIG. 3) which could be compressed by dispersion and therefore placed a lower bound on the duration of the narrowed pulses for prior art interferometers. The usable bandwidth could be extended by reducing the $t_0$ by a reduction in cavity length L. However, the increase of bandwidth attainable in this manner would shorten the available range of time delays. For this reason, prior art designs of dispersive interferometers have had to provide a multiplicity of passes of the signal through the interferometer structure by using a third (high reflectance) mirror.

By utilizing the periodic characteristic of reflecting interferometer cavities shown in FIG. 3, the present invention allows for a unique design of the cavity by specifying the cavity length L and the reflectance of the second mirror 107 in terms of the input signal characteristics, thereby eliminating the bandwidth time delay constraints encountered by the prior art and enabling significant improvement in pulse compression capabilities.

A modulated carrier wave $E(t)$ can be represented quite generally by the form $$E(t) = A(t)e^{i[2\pi f_o t + \Phi(t)]} \tag{3}$$

where t is time, $f_o$ is the carrier frequency, and $A(t)$ and $\Phi(t)$ are the amplitude and phase modulation functions, respectively. The present invention is intended to operate for signals of the form defined by Equation (3) which are further restricted as follows.

First, the instantaneous frequency $f_i$, defined as $$f_i = \frac{d}{dt}\left[f_0 t + \frac{1}{2\pi}\Phi(t)\right] \quad (4)$$

must have a linear variation in time (i.e., of the form $f_i = Kt+b$) during a substantial portion of each interval in which the amplitude function $A(t)$ is large. The coefficient $K$ of the linear variation should be the same in all such intervals. This condition guarantees that a linear frequency sweep or chirp is available for time compression when the signal envelope is large, and further that the same sweep rate applies to all chirps, so that the dispersive cavity design can be matched to the common sweep rate.

Figure 4:
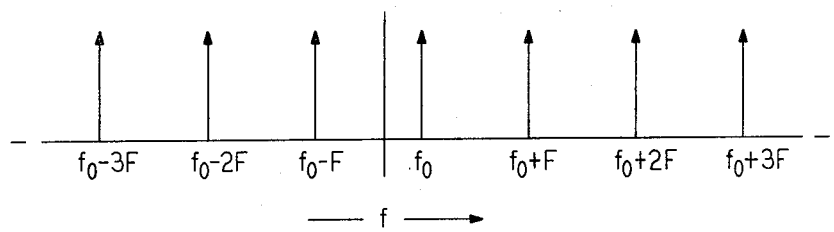
FIG. 4 shows a frequency spectrum which relates to the operation of the present invention.

Second, the frequency spectrum (i.e., Fourier spectrum) of the modulated carrier must be a spectrum of substantially discrete lines equally spaced on the frequency axis. This condition is satisfied if $A(t)$ and $\Phi(t)$ are periodic functions of time with commensurate periods. That is, $$M_1 \cdot \text{Period of } A(t) = M_2 \cdot \text{Period of } \Phi(t) \quad (5)$$

where $M_1$ and $M_2$ are integer constants. Such a frequency spectrum is known as a comb-type frequency spectrum; a comb-type spectrum is shown in FIG. 4. The graph of FIG. 4 is intended to demonstrate only the location of the various frequency components of the signal, and in no way represents particular amplitude coefficients.

This frequency spectrum is the key to the design of the dispersive cavity 104 is accordance with the principles of the present invention. The period of the characteristic curve of time delay vs. frequency shown in FIG. 3 is determined by the cavity length $L$ (axial separation of interferometer mirrors). The cavity can be made to function as a linear dispersive structure for an arbitrarily broad comb-type spectrum by choosing the length $L$ to conform with the following conditions. First, no period of the curve of FIG. 3 shall contain more than one spectral line. Second, the period of the curve shall be different from the separation between adjacent spectral lines. Third, all important spectral lines shall fall on corresponding linear segments of the curve of FIG. 3. These criteria are illustrated in FIG. 3 where the indicated frequencies $f_0$, $f_0+F$, $f_0-F$ etc., comprise a frequency comb. Moreover, in the graph of FIG. 3 each frequency of the comb is placed in a linear portion of successive periods of the $t_D(f)$ function. A load line 201 is drawn to show the $t_D(f)$ values at each of the individual frequencies of the comb. These intersection points 202, 203, 204, etc., are the operating points of the interferometer cavity according to the principles of the present invention. It is the location of these operating points, in turn, which determines the selection of the separation length $L$ of the cavity.

Since line 201 is a load line and since points 202, 203, 204, etc., are operating points for the present invention, the respective values of the $t_D(f)$ on the ordinate of FIG. 3 represent the time delays which are incurred by the frequency components of each of the operating points. Dotted lines 212, 213, 214, etc., by their intersection with the ordinate axis, indicate the time delays which are incurred by each of the components of the input signal waveform. Thus, by adjusting the location and slope of the load line 201, the variation of the operating points on the $t_D(f)$ characteristic causes a variation in available time delays. Furthermore, the slope of the load line 201 may be shown to be the proportionally constant, $p$, of Equation 1, apart from normalizing constants. Therefore, the choice of the position and slope of the load line 201 dictates the frequency dependent time delays with which the present invention operates.

Figure 5:
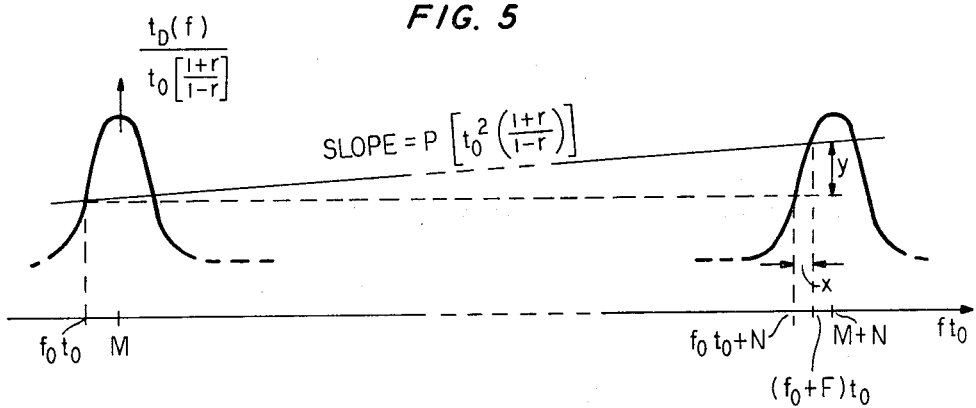
FIG. 5 shows a detailed portion of the characteristic curve of FIG. 3.

With the aid of FIG. 5, which shows in detail a portion of the graph of FIG. 3, the relation of the graphical parameters of the $t_D(f)$ curve and of the load line 201 may be related to the actual physical parameters of the interferometer dispersive structure 104. For the sake of generality, adjacent comb frequencies are assumed to fall in every $N^{th}$ period of the time delay function $t_D(f)$, although they might occur in every period of $t_D(f)$, (i.e., $N$ may be equal to 1 (as shown in FIG. 3). Thus, from FIG. 5 the relation results, $$Ft_0 = N+x \quad (6)$$

where $x/Nt_0$ is the mismatch between $F/N$, the $N^{th}$ subharmonic of the frequency interval of the comb-like spectrum, and the fundamental resonant frequency of the cavity, $f_R = 1/t_0$. In terms of the fundamental resonant frequency of the cavity, $f_R$, the mismatch $x$ can be defined by the relationship $$x = N\frac{(F/N-f_R)}{f_R} \quad (7)$$

It may be determined that the solution for the mismatch, $x$, as a function of the slope of the load line 201 is given by the expression $$x = \frac{N}{2}\left(-1+\sqrt{1+\frac{p}{g}\left(\frac{2F}{N}\right)^2}\right) \quad (8)$$

where the parameter $g$ is related to the slope $y/x$ of the linear segment of the time delay vs. frequency curve. The value of $g$ will be discussed below in connection with fine tuning. The interferometer produces greatest pulse narrowing when $1/p$ is made equal to the frequency sweep rate of the incoming signals.

Equation 8 is a general equation which relates the parameters of the interferometer cavity 104 to the various parameters of the incoming signal. The signal parameters may be varied as required, thereby producing new requirements on variations in time delay for the individual frequency components, and consequent adjustments of the integer $N$, the reflectance $r$ contained in the parameter $g$, and the mismatch $x$. Thus, once the designer selects the time delay range and bandwidth which he desires, he utilizes the relation shown in Equation 8 along with the construction of FIG. 5 to obtain the appropriate mismatch factor. Once the mismatch factor, $x$, is determined, the designer tunes the cavity separation $L$, accordingly. The cavity separation, $L$, is to be set such that $$L = \frac{c}{2F}(N+x) \quad (9)$$

where $c$ is the speed of light.

The tuning condition given by Equation 9 is in practice a condition for coarse tuning. One must also perform a fine tuning on the cavity length to center the signal line spectrum on the utilized set of linear segments of the time delay vs. frequency curve of FIG. 3. The fine tuning condition is that the carrier frequency, $f_0$, of the spectrum must fall at the midpoint of a linear segment of the curve. The value of $g$ in Equation 8 is then given by $$g(f_0 t_0; r) = \frac{4\pi r(1+r)}{(1-r)^3}\frac{\sin(2\pi f_0 t_0)}{\left[1+\frac{4r}{(1-r)^2}\sin^2(\pi f_0 t_0)\right]^2} \quad (10)$$

Since each cycle of the curve in FIG. 3 has two linear segments of opposite sign, there are two possible locations for $f_0$ yielding $g$ values of opposite sign. With the conventions adopted in FIG. 5 and Equations 6 to 9, the correct fine tuning is that which gives $g$ the same sign as $p$. These conventions all stem from the decision that $p$ shall have the same sign as the slope of the utilized linear segments of the curve of FIG. 5. An equally useful set of conditions can be derived when the sign of $p$ is opposite to the sign of the slope of the utilized linear segments of the curve. In that case, Equations 6 to 9 are replaced with similar equations in which $x$ is replaced by $-x$, and the correct fine tuning condition is that which gives $g$ the opposite sign to $p$. The accuracy required of the fine tuning amounts to a fraction of an optical wavelength. This is the constraint which makes it advantageous to illuminate the interferometer on its axis. The fine tuning can be performed empirically, once the rough tuning condition of Equation 9 has been satisfied. Means of varying the cavity length over an optical wavelength are well known. For example, this may be done by varying the voltage applied to an electrostrictive mounting for one of the cavity mirrors.

In the present invention, the normalizing time interval $t_0$ is simply $$t_0 = \frac{2L}{c} = \frac{N+x}{F} \quad (11)$$

the time required for light taking a round trip inside the cavity. It follows that the time delay range, which is proportional to $t_0$, can be increased in large steps by changing the integer $N$. Even the value $N=1$ makes the time delay range much larger than that of a single passage in prior art designs for dispersive interferometers. The time delay range can be adjusted to a lesser degree by control of the amplitude reflectance, $r$, of mirror 107.

A difference in operation between the present invention and prior art designs is readily apparent if one considers a signal source consisting of a mode locked laser followed by a synchronous chirping modulator. The input to the dispersive interferometer is then a train of chirped optical pulses with a comb-type spectrum. Compression in the prior art is accomplished by compressing each pulse independently of the others. The present invention, however, accomplishes compression by superposition of contributions from a number of successive pulses, the exact number depending upon the reflectance of mirror 107.

In summary, compressed optical pulses are produced by the following process. First, light from a laser at some carrier frequency $f_0$ is modulated in the desired manner (i.e., frequency or phase modulation). Such modulated signals must possess the aforementioned signal restrictions needed for successful operation of embodiments of the present invention, and the modulating frequency must be much smaller than optical frequency $f_0$. Since the time delay vs. frequency characteristic of a cavity having a given reflectance, $r$, is known to be the periodic function of the $ft_0$ product graphed in FIG. 3, and the function $g$, given by Equation 10, has the same periodicity in $ft_0$ as has the time delay characteristic, an operating point may be arbitrarily picked at virtually any linear portion of the characteristic. The choice of operating point thus yields an $f_0 t_0$ value, and thereby allows calculation of $g$ by means of Equation 10. This value of $g$ allows for calculation of the mismatch, $x$, using Equation 8, and the cavity separation $L$ may then be calculated by Equation 9. This cavity separation $L$ is the coarse tuning condition for the interferometer and insures the location of the operating point on a linear portion of the time delay characteristic. Finally, by appropriate means, the cavity is fine tuned to a fraction of an optical wave length in order to place the operating point precisely in the center of the chosen linear segment. In practice, fine tuning may be accomplished by subjectively observing the pulse output waveform as the cavity length is slightly varied, and choosing the setting which yields a uniform pulse compression.

It is to be understood that the above-described embodiments are illustrative of the principles of the invention and are in no way intended to define the limits or the scope of the invention. Numerous other arrangements may be devised by those skilled in the art without departing from the spirit and scope of the invention.

What is claimed is:

1. In a system which utilizes electromagnetic signals in the optical frequency range, the signals being characterized by the relation $$E(t) = A(t) e^{i\psi(t)}$$

$i$ being the imaginary root $\sqrt{-1}$, the signals $E(t)$ being restricted such that a. the time derivative of the function $\psi(t)$ is linear in the intervals in which the amplitude function $A(t)$ is large and b. the frequency spectrum of the signal $E(t)$ comprises a series of equally spaced discrete monochromatic components, interferometer means having a periodic time delay vs. frequency characteristic for subjecting the signals to a frequency dependent time delay comprising:

a cavity defined by first and second reflecting surfaces, said first reflecting surface having partial reflectance and said second reflecting surface having substantially total reflectance, the signals to be delayed being introduced through said first reflecting surface and the delayed signals being emitted from said first reflecting surface, the separation between said reflecting surfaces being adjusted such that a. no period of the periodic time delay vs. frequency characteristic of said cavity contains more than one spectral component of the frequency spectrum of $E(t)$, b. the period of the time delay vs. frequency characteristic of said cavity is different from the separation of the spectral lines of E(t), c. the spectral lines of $E(t)$ occur at substantially linear portions of the time delay vs. frequency characteristic of said cavity, said reflecting surfaces being oriented relative to one another and to said signals to be delayed such that all signals in said cavity spatially overlap one another.

2. Interferometer means as defined in claim 1 wherein said first and second reflecting surfaces each comprise curved surface portions of spherical mirrors, the concavities of said mirrors facing one another, said signals to be delayed being introduced normally to said first reflecting surface.

3. Apparatus for compressing electromagnetic pulses in time comprising:

a source of electromagnetic pulse signals, said electromagnetic pulse signals being characterized by the relation $$E(t) = A(t) e^{i\psi(t)}$$

and being restricted such that a. the time derivative of $\psi(t)$ is linear in the intervals in which A($t$) is large, and b. the frequency spectrum of E($t$) comprises a series of equally spaced discrete monochromatic components;

an interferometer cavity means having first and second reflecting surfaces, said first reflecting surface having partial reflectance and said second reflecting surface having total reflectance;

means for coupling the electromagnetic pulse signals from said source in a line normal to said first reflecting surface and for coupling to an output compressed pulses emitted from said first reflecting surface, the separation between said reflecting surfaces being adjusted such that a. no period of the time delay vs. frequency characteristic of said cavity contains more than one spectral component of the frequency spectrum of $E(t)$, b. the period of the time delay vs. frequency characteristic of said cavity is different from the separation of the spectral lines of $E(t)$, and c. the spectral lines of $E(t)$ occur at linear portions of the time delay vs. frequency characteristic of said cavity;

said reflecting surfaces being oriented relative to one another and to said electromagnetic pulse signals such that all signals within said cavity means spatially overlap one another, each compressed pulse including the superposition of portions of a plurality of different pulses from said electromagnetic pulse signals.

4. Apparatus for compressing electromagnetic pulses as defined in claim 3 wherein said source of optical pulse signals comprises a mode-locked laser, modulating means for synchronously modulating the output light from said laser, the signals from said modulating means being a train of electromagnetic pulses, each of the pulses of said train having a linear frequency variation in time; and said means for coupling includes mode matching lenses for grouping in space similar frequency components of the pulses from said modulating means, and directional coupler means for applying the pulses from said modulating means to said mode-matching lenses.

5. Apparatus for compressing electromagnetic pulses as defined in claim 3 wherein said source of electromagnetic pulse signals comprises a single frequency laser, a sinusoidal phase modulator for modulating the output light from said laser; and said means for coupling includes mode matching lenses for grouping in space similar frequency components of the pulses from said phase modulator and means for applying the pulses from said modulating means to said mode matching lenses.

6. Interferometer apparatus for providing a frequency dependent time delay to an optical signal whose frequency spectrum consists of a series of substantially discrete monochromatic components equally spaced at an interval of F Hertz, said interferometer apparatus comprising a cavity having first and second reflecting surfaces separated by a distance $L$ and having a fundamental resonant frequency of $f_R$, said first reflecting surface having partial reflectance and said second reflecting surface having substantially total reflectance, signals to be delayed being introduced normally to said first reflecting surface and delayed signals being emitted from said first reflecting surface, said distance L being defined by the relation $$L = \frac{c}{2F} (N+x)$$

where $c$ is a constant equal to the speed of light, $N$ is an integer equal to or greater than unity, and $x$ is a mismatch factor defined by the relation $$x = N \frac{(F/N - f_R)}{f_R}$$

said reflecting surfaces being oriented relative to one another and to said signals to be delayed such that all signals in said cavity spatially overlap one another.

7. Apparatus for compressing electromagnetic pulses in time comprising a source of electromagnetic pulse signals that are characterized by the relation $$E(t) = A(t) e^{i\psi(t)}$$

where $i$ is $\sqrt{-1}$, and the signal $E(t)$ is restricted such that (a) the time derivative of the function $\psi(t)$ is linear in the intervals where the amplitude function $A(t)$ is large, and (b) the frequency spectrum of $E(t)$ consists of a series of substantially discrete monochromatic components equally spaced at an interval of $F$ Hertz, an interferometer cavity means defined by first and second reflecting, surfaces separated by a distance $L$ and having a fundamental resonant frequency of $f_R$, said first reflecting surface having partial reflectance and said second reflecting surface having substantially total reflectance, means for coupling the electromagnetic pulse signals from said source in a line normal to said first reflecting surface and for coupling to an output the delayed signals being emitted from said first reflecting surface, the distance $L$ being defined by the equation $$L = \frac{c}{2F} (N+x)$$

where $c$ is a constant equal to the speed of light, $N$ is an integer equal to or greater than unity, and $x$ is a mismatch factor defined by the equation $$x = N \frac{(F/N - f_R)}{f_R}$$

said reflecting surfaces being oriented relative to one another such that all signals in said cavity spatially overlap one another, each compressed pulse including the superposition of portions of different pulses to be compressed.

8. Apparatus for compressing electromagnetic pulses as defined in claim 7 wherein said first and second reflecting surfaces each consist of a curved surface portion of a spherical mirror, and said first and second reflecting surfaces are arranged such that the concavity of said first reflecting surface faces the concavity of said second reflecting surface.

9. In a system having pulsed signals characterized by a periodic comb-type frequency spectrum, each pulse having a linear frequency sweep as a function of time, and an interferometer cavity defined by first and second reflecting surfaces and having a periodic time delay versus frequency characteristic, said first reflecting surface having partial reflectance and said second reflecting surface having total reflectance, a method of compressing said pulses comprising the steps of:

applying said input pulses normally to said first reflecting surface;

adjusting the orientation of said reflecting surfaces relative to one another and to said input pulses such that consecutive reflections in said cavity spatially overlap one another; and adjusting the separation of said reflecting surfaces such that spectral lines of said comb-type frequency spectrum occur at linear portions of the time delay versus frequency characteristic of said cavity, and that said time delay versus frequency characteristic of said cavity has a periodicity smaller than the periodicity of said comb-type frequency spectrum.

10. In a system having pulsed signals characterized by a periodic comb-type frequency spectrum consisting of a series of substantially discrete monochromatic components equally spaced at an interval of $F$ Hertz, each pulse of said pulsed signals having a linear frequency sweep as a function of time, and an interferometer cavity defined by first and second reflecting surfaces, said first reflecting surface having partial reflectance and said second reflecting surface having total reflectance, a method of compressing said pulses comprising the steps of applying said pulsed signals in a line normal to said first reflecting surface, adjusting the orientation of said reflecting surfaces relative to one another and to said pulsed signals such that consecutive reflections in said cavity spatially overlap one another, and adjusting the separation of said reflecting surfaces to a distance of L where L is defined by the equation $$L = \frac{c}{2F} (N+x)$$

where $c$ is a constant equal to the speed of light, $N$ is integer equal to or greater than unity, and $x$ is a mismatch factor defined by the equation $$x = N \frac{(F/N - f_R)}{f_R}$$

where $f_R$ is the fundamental resonant frequency of said cavity.

* * * * *